Oct. 5, 1943.    R. C. MARHOLZ ET AL    2,330,833
RADIO CONTROL APPARATUS
Filed March 23, 1939    6 Sheets-Sheet 2

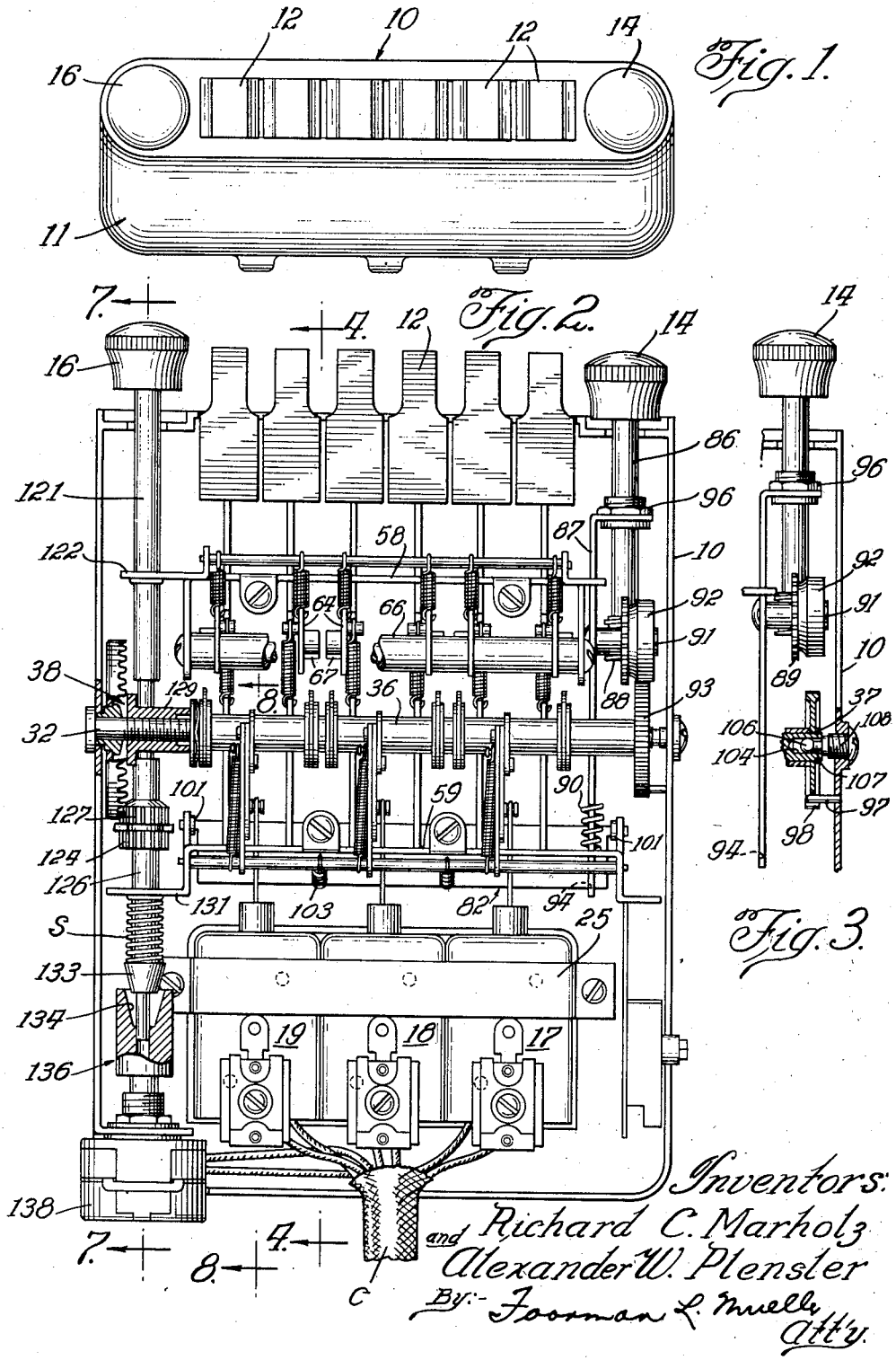

Inventors:
Richard C. Marholz
and Alexander W. Plenster
By Foorman L. Mueller
Att'y

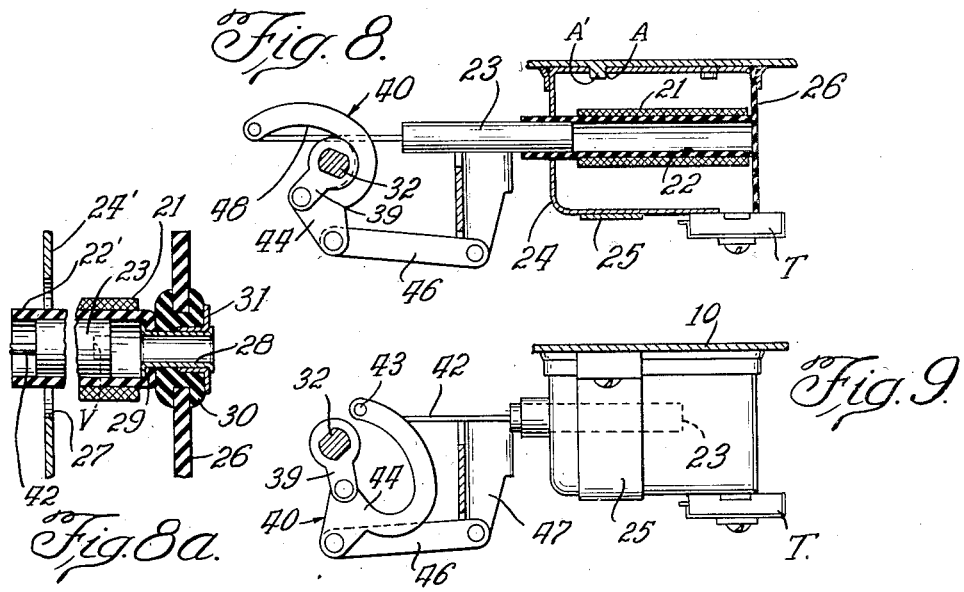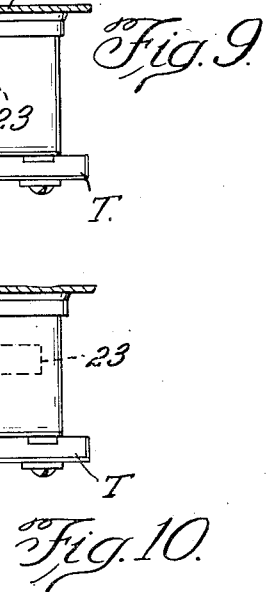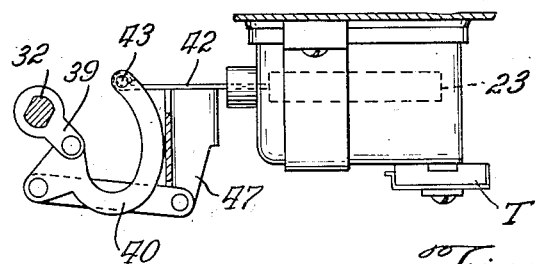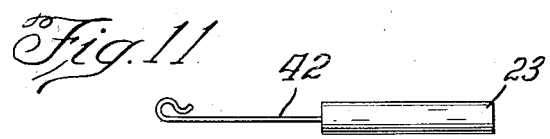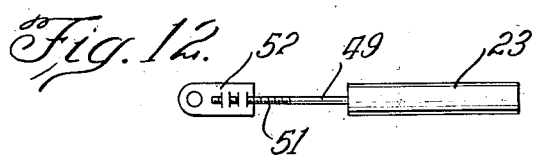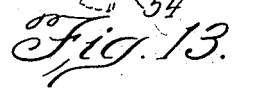

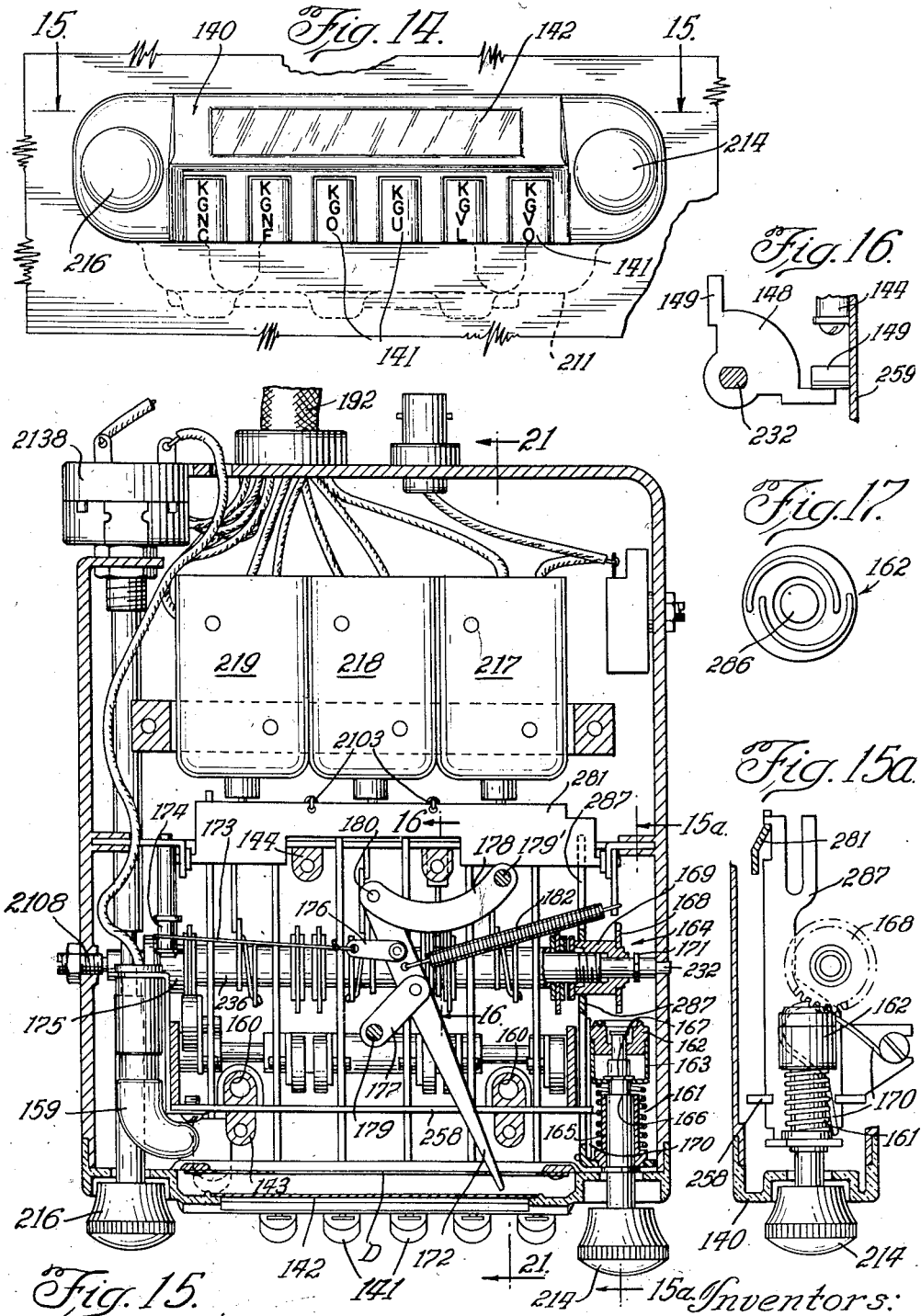

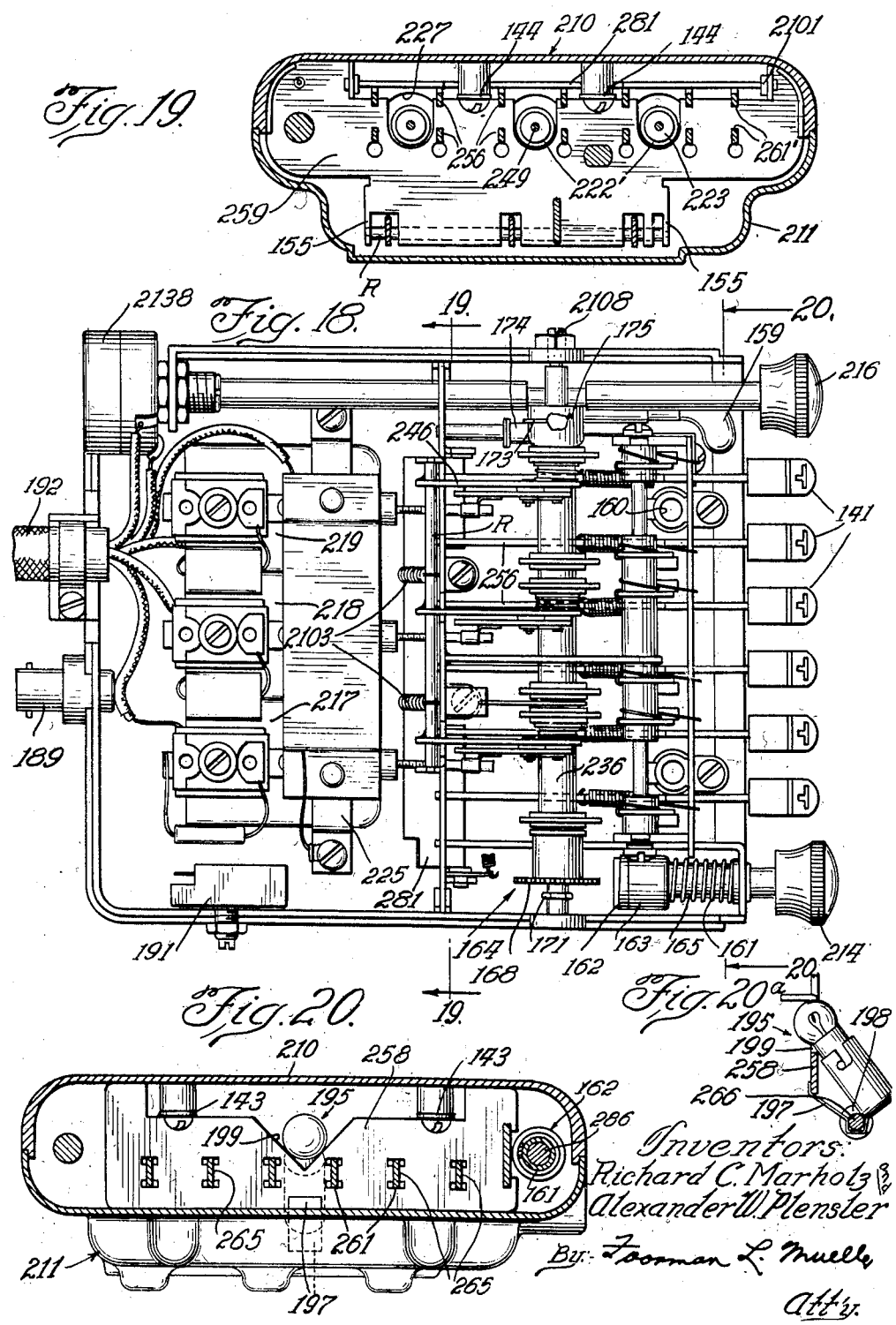

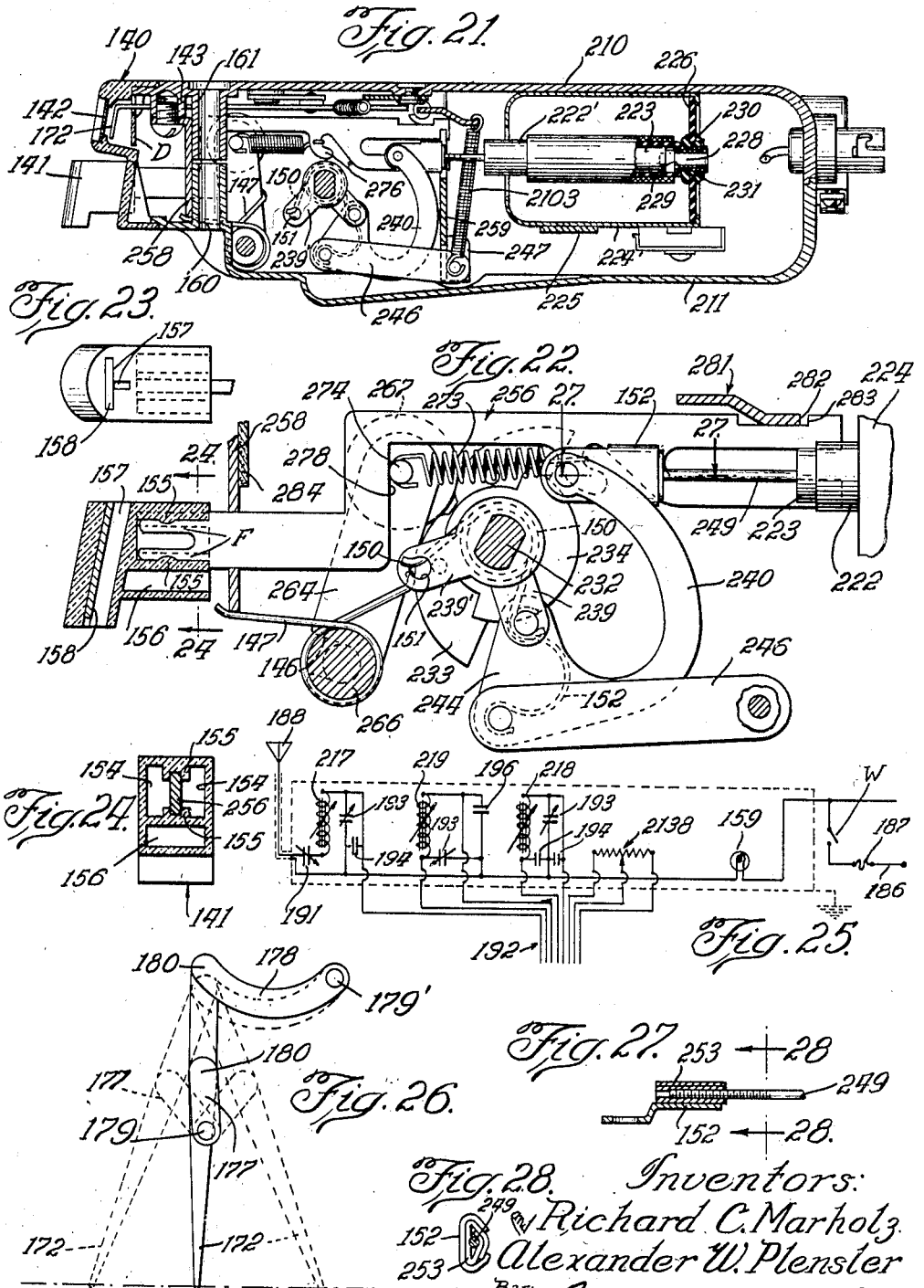

Patented Oct. 5, 1943

2,330,833

UNITED STATES PATENT OFFICE 2,330,833

RADIO CONTROL APPARATUS

Richard C. Marholz and Alexander W. Plensler, Chicago, Ill., assignors to Belmont Radio Corporation, a corporation of Illinois Application March 23, 1939, Serial No. 263,730

36 Claims. (Cl. 171—242)

Our invention relates in general to control apparatus and more in particular to a tuning system for a radio receiver. In this connection the present application relates to pending application, Serial No. 204,032, filed April 25, 1938 which has matured into Patent 2,256,668, issued September 23, 1941.

It is an object of our invention to provide an improved control system for controllable apparatus, and particularly an improved tuning system for a radio receiver.

Another object of our invention is to provide a compact, self-contained tuning system which will completely accomplish tuning for a radio receiver and yet is spaced therefrom and connected therewith only with an electrical cable.

It is also an object of our invention to provide a manually operated automatic tuner operating with a short stroke and a pleasant "feel" so that tuning may be accomplished quickly and pleasurably.

A further object of our invention is to provide an improved permeability tuning system for a radio receiver. The system may be satisfactorily applied either to an automobile radio receiver or to a home radio receiver as representing the two general classifications in the radio art.

One of the features of our invention is the provision of a manual tuner for predetermined broadcast stations which employs linearly movable selector members whose movement is converted into rotary movement and then back to linear movement in a manner such that the mechanism for accomplishing the conversion is mounted into a very small compact space.

Another feature is the provision of a manually operated automatic tuner having linearly movable selector members which operate with a very short stroke with a small amount of operating pressure.

A further feature of our invention is the provision of a yielding connection between two of the elements in the automatic tuning or control mechanism to provide a cushioned stopping action at the end of a tuning stroke for an automatic tuning selector unit and hence a pleasant "feel" in tuning with the yielding connection also providing for a limited yieldability between these two elements when the mechanism is in tuned position to eliminate the danger of loosening or breaking of these elements as a result of a severe jar being applied to the control mechanism. This feature is particularly valuable when the mechanism is adapted to an auto radio receiver.

A still further feature of our invention is the provision of an extremely small self-contained, and demountable radio tuning unit which can be readily mounted in numerous restricted spaces on an automobile control panel so as to be inconspicuous, yet extremely decorative in appearance.

Another feature is the provision of simplified indicating structure for the tuning unit which operates in a flat, relatively thin space for indicating over a narrow horizontally extending dial scale the tuning position of the control mechanism, with the operating mechanism for the indicator operating generally in a plane at right angles to the plane of the dial.

One of the advantages of our invention arises in the rapid assembly and low labor, as well as material, costs possible as the result of the simplified construction of our control unit.

Other objects, features, and advantages of our invention will be apparent from the following description taken with the drawings in which:

Fig. 1 is a front elevation of the self-contained control unit of our invention.

Fig. 2 is a plan view of our tuning apparatus in actual size with the cover for the housing removed. The cover is actually the bottom portion as viewed in Fig. 1.

Fig. 3 is a fragmentary detail view partly in section of the manual tuning portion of the control apparatus as shown at the right-hand upper corner of Fig. 2.

Fig. 8 is a detail vertical sectional view along the line 8—8 of Fig. 2 with the variable inductance unit, however, in the position illustrated in Fig. 4.

Fig. 8a is a fragmentary view of a modified inductance unit.

Fig. 9 is a similar view with this unit in the position corresponding to the position of the push-button structure of Fig. 5.

Fig. 10 is a similar view with this unit in the position of Fig. 2, and also Fig. 6.

Figure 4:
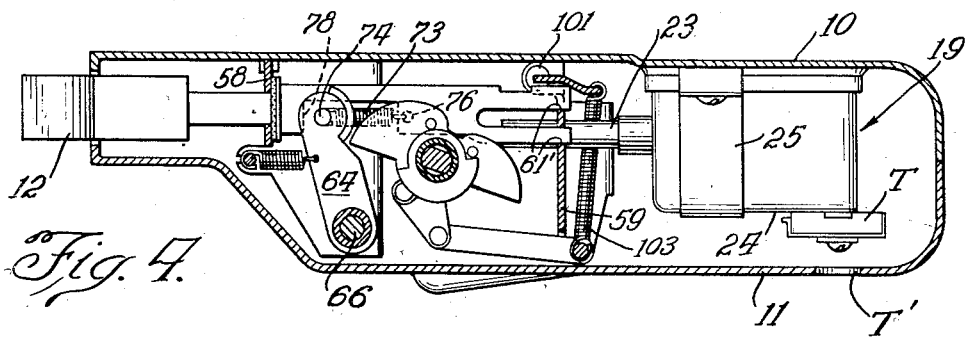
Fig. 4 shows one of the tuning control units in the complete apparatus with the cover in place and as to the control unit, is a vertical sectional view along the line 4—4 of Fig. 2. A portion of the unit is in a changed position with reference to the position in Fig. 2.

Figs. 11, 12, and 13, are detail views of a movable metal slug in three different modifications for use in the frequency changing unit illustrated in the preceding figures.

Fig. 14 is a front elevation of a complete control device in a modified embodiment of our invention, illustrated as it appears when in mounted position behind a panel.

Fig. 15 is a top plan view of the apparatus of the device of Fig. 14 approximately along the line 15—15 of such figure. This illustration corresponds in size exactly with a commercial embodiment of our invention.

Fig. 15a is a view in elevation showing the manual tuning and friction varying structure, and the clutch therein, in an operating position, looking in the direction of the arrows along the line 15a—15a of Fig. 15.

Fig. 16 is a fragmentary sectional view along the line 16—16 of Fig. 15, of a stop portion for limiting the angular movement of the control shaft.

Fig. 17 is an enlarged face view of a spiral reduction gear for the manual tuning and friction varying structure of the control apparatus.

Fig. 18 is a bottom plan view of the complete device of Fig. 15 with the bottom cover removed.

Fig. 19 is a vertical sectional view of the completely assembled device along a line corresponding to the line 19—19 of Fig. 18 except that the structure of Fig. 19 is turned completely over from the position of Fig. 18 and corresponds to Fig. 14.

Fig. 20 is a view similar to Fig. 19 along the line 20—20 of Fig. 18.

Fig. 20a is a fragmentary perspective view of a modification of the dial lamp assembly.

Fig. 21 is a view in vertical section substantially along the line 21—21 of Fig. 15.

Fig. 22 is an enlarged detail view partly in section of the control mechanism of Fig. 21, with the variable inductance unit, however, shown in a fragmentary portion.

Fig. 23 is a top plan view of the push-button of Fig. 22.

Fig. 24 is a sectional view along the line 24—24 of Fig. 22.

Fig. 25 is a circuit diagram of the modification of Fig. 14 although it also applies generally to the device of Fig. 1.

Fig. 26 is a detail view showing the indicator mechanism and associated connecting links in various indicating positions for this structure. The complete structure is shown in Fig. 15.

Fig. 27 is a view in horizontal section along the line 27—27 of Fig. 22.

Fig. 28 is a vertical sectional view along the line 28—28 of Fig. 27.

Referring more particularly to the structure of Figs. 1 to 13, the complete tuning system of our invention is mounted in a pair of housing members 10 and 11 which are preferably die-cast, with the former acting as the mounting member of the housing and the latter as the removable cover therefor. The two members 10 and 11 of the housing are shaped so as to provide openings at the front for the finger buttons 12, a tuning knob 14, and associated shaft, and a friction varying and volume control knob 16 and associated shaft, as shown in Fig. 1. Tuning indicating structure is not shown, but if desired, mechanism similar to that shown in Fig. 15 may be adapted to the unit. Within the housing is provided means for tuning tube circuits in a radio receiver from one signal frequency to another and then for changing the volume of reproduction of the received frequencies. The radio receiver with tube circuits is normally entirely independent of the tuning system in the housing, from a physical standpoint, and is connected thereto only by an electrical cable. The tuning from one frequency to another is accomplished by means of variable inductances and is generally referred to as permeability tuning. Our control apparatus may be adjusted so as to change the operating position of the variable inductances and cover the entire range of frequencies accommodated by the radio receiver, and it will also act to quickly adjust the inductances to selected predetermined frequencies in a so-called automatic manner. The control apparatus may be satisfactorily employed as a remote control unit with reference to a radio receiver and connected thereto by an electric cable, or it may be mounted directly into a radio receiver cabinet and connected with the tube circuits through a cable.

More particularly with reference to the variable inductances in our control apparatus, we provide three coils units 17, 18 and 19, for electrical connection with the antenna circuit, the oscillating circuit, and the radio frequency circuit, respectively, of a radio receiver. Although, normally three coil units are required, the number depends upon the particular circuit employed in a radio receiver to which the tuning control device is to be connected. The coil units are identical except for the electrical value of the coil, and each unit includes (Fig. 8) an inductance winding 21, an insulating core 22, and a metal slug 23 movable in the core. The core is mounted in a shielding can 24 which in turn is rigidly secured to the housing member 10 by means of a strap 25 common to all of the coil units. The core is supported at one end in an aperture in the end wall of the can and at the other end by an insulating plate 26. Each unit also includes a trimmer condenser T which may be adjusted through an opening T' in the member 11 of the housing.

A modification, but in fact the preferred mounting for each inductance unit in a can 24' is illustrated in Fig. 8a. The insulating core 22' for the coil extends through an enlarged opening 27 in the can at one end and is yieldingly mounted at the other end by means of an eyelet 28 extending through an aperture 29 in the back end of the core, and a rubber grommet 30 in a corresponding aperture in the insulating plate 26 closing the back of the can. In order to provide an exceptionally positive mounting for the core a one-half eyelet member 31 with an enlarged outer bearing surface is employed intermediate the eyelet 28 flange and the grommet 30. With this mounting for the core it can move slightly up and down to follow the movement of the driven slug 23, if in fact there is such movement, so that there will be no binding between the slug and core. Furthermore, the eyelet 28 permits access to an irregularly shaped cavity V provided in the end of the slug 23. With a slug provided with adjustable coupler means as illustrated in Figs. 12 and 13, for instance, a tool may be inserted through the eyelet and fitted into the cavity to rotate the slug.

The metal slugs 23 in each of the coil units 17, 18 and 19, which preferably consist of comminuted iron particles pressed together into a desired shape and size, move linearly simultaneously, and in order to properly tune the corresponding tube circuits in a radio receiver they must bear a predetermined relation to one another so far as their position in the coil windings are concerned. To facilitate the original electrical alignment of the three units, assemble the units in the housing, and maintain such alignment, the completely assembled units are first set up in a jig, and by means of meters are properly aligned. Each set of three aligned inductance coil units is then mounted on the member 10 of a housing with the apertures A in the cans 24 fitting over corresponding bosses A' cast into the member 11 in a desired position.

Figure 5:
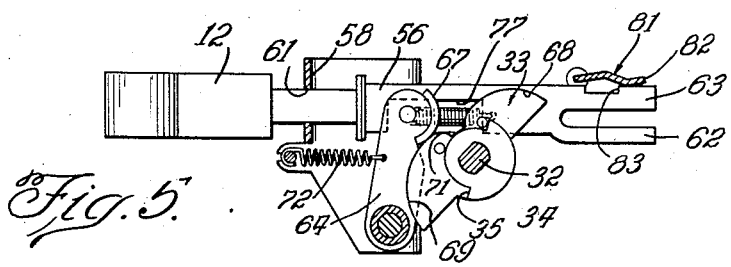
Fig. 5 is a detail view of a portion of the control unit shown in an advanced position relative to the position of the same structure in Fig. 4.
Figure 6:
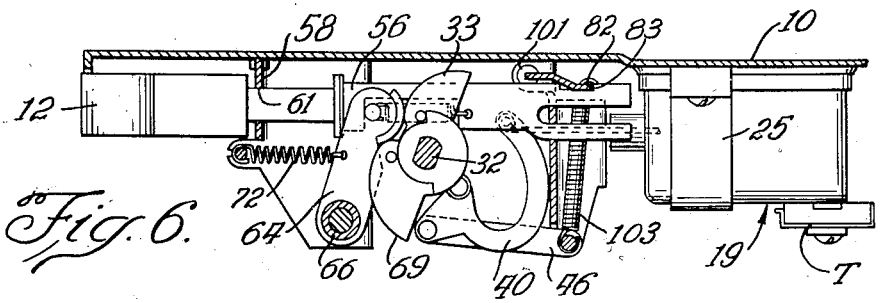
Fig. 6 is a view in section similar to that of Fig. 4 showing the control unit in final set position as contrasted to the preliminary positions illustrated in Figs. 4 and 5. All of the structure of Fig. 6 except the push button and connected rod is in the position as illustrated in Fig. 2.

The slugs 23 are moved in their respective coils by means including a rotary shaft 32 journalled in the frame for the housing as will be more fully described, and cams or control members 33 retained on the shaft 32 under frictional pressure but adjustable relative to such shaft when the frictional pressure is removed. Any desired number of control members 33 may be employed in a tuning unit according to the number of predetermined tuning positions it is desired to obtain. The control members or cams are part of an axially movable assembly including such control members and friction washers 34 keyed to the shaft as shown in Figs. 4 to 6, and spacing collars 36. The friction washers have a pair of spaced apart shoulders 35 for engagement with a corresponding stud or projection on the control member for limiting the angular rotation of the latter with reference to the shaft. This is described more specifically in Patent No. 2,130,153. The axially movable assembly is limited in its movement to the right, as viewed in Fig. 2, by means of a lock washer 37 (Fig. 3) fixedly secured to the shaft. Axial movement of the assembly in that direction to apply holding friction to the control members in the assembly is accomplished by means of a toothed friction unit 38 threadably secured to the shaft at the left-hand end thereof.

Each slug 23 is operatively connected with the shaft 32 through a radial arm 39 (Figs. 8 to 10) and is movable linearly while the shaft is being rotated. Each arm 39 is keyed against rotation on the shaft 32, but is axially movable thereon with the complete control assembly as described above. A sickle-shaped link 40 is pivotally connected to the arm 39 and in turn is coupled to the slug 23 through a coupler link 42 (Fig. 11) which in turn is pivoted to an insulated stud 43 rigidly secured to the outer end of the link 40. In this manner the slug 23 is insulated from the remainder of the control mechanism. The link 40 has a body portion 44 pivoted to the arm 39 as previously described and likewise pivoted to a guide link 46 which is pivotally secured to the frame portion 47 rigidly mounted in the member 10 for the housing. Considering the slug 23 in its outermost position (Fig. 8), the cavity 48 in the sickle-shaped arm portion of the link 40 fits over the assembly on the shaft 32. As the shaft is rotated in a counter-clockwise direction, the link 40 guided by the link 46 moves away from the shaft through the position illustrated in Fig. 9 until the slug 23 is in its innermost position as shown in Fig. 10. With this connecting mechanism rotary motion is converted into linear movement and the transformation is accomplished in a limited longitudinal space as a result of the sickle-shape for the arm of the link 40 which makes it possible to more-or-less telescope the link over the assembly on the shaft 32.

A modification of the slug coupling structure is shown in Fig. 12 in which a wire or rod 49 is rigidly secured in a slug 23, and is provided at its outer end 51 with threads to adjustably receive a metal coupling member 52. The latter may be hooked onto the insulating stud 43 in the same manner as described for the hooked rod 42 in Fig. 11. A further modification in an adjustable coupling is illustrated in Fig. 13 wherein a rod as 49 is rigidly secured in a slug 23 and carries at its threaded end 51, an insulating block 53 which is split at 54 to provide a pair of slightly resilient legs at one end of the block. Each leg has a slight cavity which together form an aperture for fitting over the threaded end 51. The width of the slot 54 and the aperture therein is such that the legs will resiliently and frictionally grip the threaded portion 51 to provide any desired adjustment between the block 53 and the rod 49. The block 53 is connected to the link 40 by means of a stud 43' which may be of metal because the block 53 itself provides the necessary insulation between the slug 23 and the remainder of the control mechanism.

In all of the coupler structures as illustrated in Figs. 11 to 12, as well as Fig. 27, as will be described, the coupling rod is molded into the slug in the original manufacture thereof.

The shaft 32 may be rotated to predetermined angular positions through the medium of the cams or control members 33 and associated selectors, or the shaft may be rotated throughout its entire angular range by means of a manually operated shaft having the knob 14 on the end thereof. As to the cams or control members 33, and their associated selectors, the latter each include an elongated stamped-out actuator portion 56 having a finger button 12 on one end thereof, and is supported at two spaced apart points on the frame means within the housing. Such frame means include a transversely vertically extending plate 58 adjacent the front of the housing, and a plate portion 59 intermediate the front and back of the housing. Vertical slots or apertures 61 are provided in the plate portion 58 for each actuator, while the actuator is split into a pair of legs 62 and 63 at its rear end which fit in corresponding slots or apertures 61' in the plate portion 59.

Linear movement in each selector is transmitted to a corresponding control member 33 to provide rotary movement therefor, through an intermediate lever 64 which is pivotally secured to a stationary shaft 66 or frame portion on the frame means in the housing. Each lever 64 has a stamped-out engaging portion 67 integral with the lever for engagement with either a cam edge 68, or a cam edge 69 extending in substantially opposite directions from a cavity 71 in the control member 33. The lever 64 is operated against spring pressure in the spring 72 and is connected with a selector at its actuator portion 56 by means of a spring 73 secured at one end to a stud 74 on the lever, and at the other end directly to the actuator portion at 76.

In the manually operated automatic tuning devices for radio receivers of the prior art, the lever or a linearly movable push-button, depending upon the particular type of actuator employed, adjusts the device and goes into set position corresponding to a predetermined tuning position by engagement with one or more metal surfaces or edges. This provides a harsh metallic contact which can be felt by the operator and provides a somewhat unpleasant feel for the operation. Furthermore, on those automatic tuning devices where the actuator is retained in an operated position so as to indicate the particular station which is being received, a rigid metallic connection is provided between the operating elements of the tuning system. A heavy shock or the like being applied to the elements in this condition may cause one or more of the elements to become loosened, thrown out of alignment, or be affected adversely. In order to overcome these difficulties, the connection through the lever 64 between our selector at the actuator portion 56 and the control member is accomplished in a yielding manner to provide a pleasant, cushioned touch for the operator, and cushion any jars or shock so that no damage will result in the control mechanism. As will be noted in Figs. 4 and 5, the movement of the lever 64 from its idle position in Fig. 4 to a partially operated position in Fig. 5 is normally accomplished wholly by means of the spring 73. As the selector stroke continues as illustrated in Fig. 6, the shoulder 78 in the cavity 77 engages the stud 74 in the lever to push the engaging portion 67 of the lever into the final tuned position, engaging both cam edges 68 and 69 at the cavity 71. The tension in the spring 73 is calculated so that this stud and shoulder engagement normally occurs only after the tuning stroke of the selector has begun so that the operator originally encounters what can be called a relatively soft touch. The point of engagement depends upon the inertia to be overcome in initiating movement of a cam and hence the entire rotary shaft 32 assembly and the strength of the spring. Inasmuch as the spring 73 is likewise pulling on the lever 64 through the stud 74, the spring pressure will assist the driving pressure at the shoulder 78 in bringing the engaging portion 67 into the final tuning position on the control member 33.

As will be described more fully hereinafter, each operated selector member is latched in operated position until it is desired to tune in some other station. This is accomplished by means of a latch bar 81 having a latching edge 82 for engagement against a corresponding latching shoulder 83 on the actuator portion 56 (Figs. 4 to 6, inclusive). As shown in Fig. 6, the latching shoulder 83 for each selector is provided at a position so as to be slightly beyond the latching edge 82 when the lever 64 and control member 33 are in the final tuned or set position. When the operator's finger is removed from the button 12, the spring 72 pulls the actuator to the left as viewed in Fig. 6 for engagement between the edge 82 and shoulder 83. This slight return or recoil movement of an operated selector member softens the end of the tuning stroke, and with the stroke as a whole being extremely short with our structure, the softness or yieldability at the beginning and end of a short easy stroke provides a very pleasant "feel" for the operator which more closely resembles the "feel" of a switch button than of a mechanical selector member. At the same time, although the tension in the spring 73 is sufficient to hold the control member 33 and the rotary shaft 32 in precise tuned or set position, there will be a cushioning effect between the selector and its associated lever and control member through the stud 74 and shoulder 78 by virtue of the spring 73 coupling. When an operated selector member is unlatched on a succeeding tuning operation, the spring 72 connected to the lever 64, pulls the lever and the selector to the left as shown in Fig. 4 until a stop member 83 on the selector engages the frame plate portion 58.

Although the cam and selector structure, including the lever 64 will always be in the position illustrated in Fig. 6 when they are in a final tuned or set position, the slug 23 may be in any position from the extreme outward position of Fig. 8, to the inward position of Fig. 10. Such position of the slug is determined by the angular relation between the shaft 32 and control member or cam 33 which relation or position may be varied by "setting" the cam on the shaft as will be explained.

As previously mentioned, the control apparatus is operated not merely to a plurality of predetermined tuning positions, but is also operated over the entire tuning range of the apparatus. The latter is accomplished by the structure including the knob 14, a shaft 86 to which it is secured, a combination guide and latching member 87 slidably mounted on the frame portion 58 and 59, and a worm 88 secured to a shaft 86. The worm 88 is meshed with a gear 89 supported on a stud shaft 91 carried on the slidable member 87. Secured to the same shaft 91 is a friction wheel 92 with a yieldable surface, preferably of rubber composition, which may be pushed into frictional engagement with a wheel 93 rigidly secured on the shaft 32 and having an engaging surface which is grooved or otherwise roughened to provide a better driving engagement with the friction wheel 92. The manual tuning portion is spring pressed by the spring 90 on one of the legs at the back of the member 87 and is normally carried in an idle position such as shown in Fig. 3. When it is desired to operate the same the knob 14 is pushed inwardly carrying the shaft 86 and the member 87 therewith until the locking shoulder 94 on the member 87 is latched over the latching edge 82 of the latch 81. This brings the friction wheel 92 into yielding frictional engagement with the wheel 93 as previously explained, and then upon rotation of the knob 14, and consequently the shaft 86 in the bearing 96, the shaft 32 is moved throughout its entire angular range of movement. This is 90° in this particular embodiment and with the mechanism intermediate the shaft 32 and slugs 23, this 90° movement is translated into one and one-quarter inches of linear movement, in an inward or outward direction with reference to the core 22, but it is understood that other degrees of movement may be provided for it. The stop 97 in the housing member 10 engages corresponding shoulders 98 in the wheel 93 spaced approximately 90° apart so as to stop the movement of the shaft at each of the end limits.

More specifically as to the latch 81, this comprises an elongated bar or plate having pivot portions 101 (Fig. 2) at each end thereof for pivotally mounting the bar in the frame for the tuner. The latch bar is formed so as to have a beveled portion 102 intermediate its transverse edges, one of which is the latching edge 82. As the actuator portions 56 of the selector members, or the member 87 of the manual tuner portion, are pushed inwardly to operating or tuning position, the upper front edge of each as viewed in Figs. 4 to 6, inclusive, engages the beveled portion 102 and pivots the latch bar away from these various members. This is shown in Fig. 5. In the event that one of the members is latched in operating position, it will be unlatched by this action. Under tension of springs 103 intermediate the frame and the latch bar, the latter is pulled into latching position with the latching edge 82 in engagement either with a shoulder 83 on a selector member or a shoulder 94 on the member 87 of the manual tuner.

It is of course desirable to have the automatic tuning portion, particularly, of the complete control apparatus operating with the least possible friction intermediate its parts so that a very slight force is required to push a selector member into tuned position. Among other things, this requires that the shaft 32 rotates as freely as possible, and to accomplish this would normally require a careful mounting of the shaft in the frame to secure accurate alignment across the entire apparatus. We facilitate the original mounting of the shaft in the frame, and at the same time, cut down friction to a minimum, by providing a substantially universal bearing at one end as shown in Fig. 3. A cavity 104 in the end of the shaft fits over a spherical end 106 on a stud bearing which also includes a restricted neck portion 107 in back of the end 106. A threaded portion 108 makes it possible to threadably secure the bearing in the wall of the housing member 10 and this bearing may be screwed into a housing member 10 after the shaft is put in place in the assembly. With the rounded end and restricted neck portion construction, the shaft 32 can be slightly out of proper transverse alignment in the control apparatus and yet rotate very freely on the bearing.

Although the general operation of the control apparatus is apparent from the above description, it might be explained briefly that the inductance coil units 17, 18 and 19, are simultaneously adjusted to change the frequencies being reproduced by a radio receiver to which the control apparatus is electrically connected, by means of the tuning knob 14 and associated structure. Or, the control apparatus may be tuned to any one of a plurality of predetermined frequencies corresponding to the selector members, each of which includes a button 12. The actual adjustment of the inductance coil units, when being moved by a selector member, is controlled by the control or cam member 33 corresponding to the selector member. With the configuration for this member as employed herein, each cam edge 68 and 69 will provide a total angular movement for the shaft 32 of 90°. Engagement of the portion 67 with one of the cam edges 68 or 69 causes the control member to move either clockwise or counter-clockwise depending upon the particular edge engaged, as will be apparent from a consideration of Figs. 4 to 6. When the linear movement of a selector member 56 and the pivotal movement of the corresponding lever 64 accomplishes rotary movement of the control member 33 associated therewith to the tuning position of Fig. 6, the slugs 23 in the inductance coil units are likewise in their corresponding predetermined tuning position. By releasably latching either the manual tuning unit or a selector unit in operated or tuned position, an operator can tell at a glance the operating condition of the control apparatus. Latching the manual tuner unit in operating position likewise insures the necessary frictional engagement between the friction wheels 92 and 93. The latch bar 81 normally holds only one control unit in operating position at a time as was explained above, although more can be held latched if the operator holds a previously operated unit, while pushing in another button or unit so that the previously operated unit won't be pushed into idle position by the spring as 72 or 90 thereon.

Figure 7:
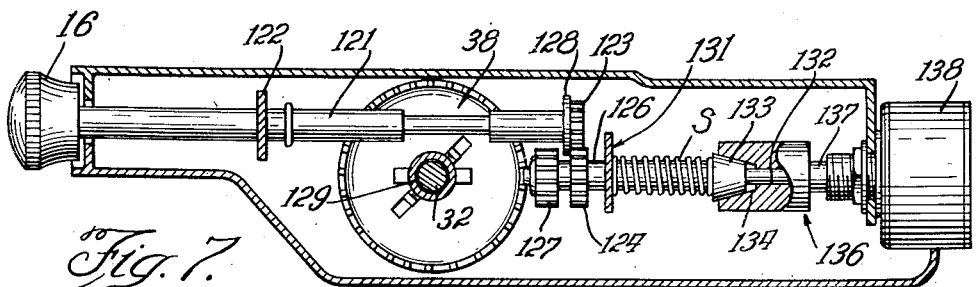
Fig. 7 is a detail cross-sectional view along the line 7—7 of Fig. 2, showing the friction varying and volume control means for the control apparatus. In this figure the cover is in place.

The operation as described above, presupposes that the control members 33 have all been originally set to some particular angular position relative to shaft 32 which likewise determines the linear position of the metal slugs 23 tuning in a corresponding signal frequency. In this set condition, the control members are all held frictionally at the desired position in the axially movable assembly on the control shaft. In originally accomplishing this setting and subsequently changing the setting the holding friction applied by the washers 34 on the control members 33 is first of all removed. This is accomplished by means of the combination volume control and friction varying unit including control knob 16 secured to a longitudinally slidable shaft 121 which is supported in the general frame structure at the portion 122 (Fig. 7). A pinion gear 123 is secured to the end of the shaft for meshing engagement with a corresponding pinion gear 124 secured to a slidable shaft 126. A pinion gear 127 spaced slightly from the gear 124 is likewise secured to the shaft 126 to one side of the gear 123, and a collar 128 rides in a groove intermediate the gears 124 and 127. The collar may be used to move the latter gear and the shaft 126 with it to bring such latter gear into meshing engagement with the friction unit 38. The latter is provided with a crown gear portion having large teeth thereon which will compensate for any "creeping" action as between the member 38 and gear 127 and still maintain an operative connection. The friction unit also includes an internally threaded body portion 129 threadably secured on a corresponding threaded portion on the shaft 32 as shown in Fig. 2. The shaft 126 is supported for slidable longitudinal movement by the frame bracket 131, and an extension 132 thereon. A friction member 133 secured to the shaft 126 is adapted for frictional clutching engagement with a corresponding surface in a cavity 134 on the clutch member 136 rigidly secured to the shaft 137 for the volume control member 138.

Upon pulling the knob 16 outwardly the shaft 121 is moved therewith against the pressure of spring S on the shaft adjacent the clutch member 133, and the pinion gear 127 is brought into meshing engagement with the crown gear on the unit 38 as shown in Fig. 2. The knob 16 is then rotated in a direction to threadably move the body portion 129 of the friction varying unit to the left, as viewed in Fig. 2. The unit is not actually unscrewed until the rotation of the shaft 32 is stopped by the pin 97 at a limiting shoulder in the wheel 93. Continued rotation of the knob 16, however, causes the friction to be removed sufficiently so that a cam or control member 33 can be moved relative to the shaft 32. A selector button 12 is then pushed inwardly to move the associated mechanism to a set or tuning position such as shown in Fig. 6. While the operator continues to hold his finger on the button 12, the knob 14 with the carriage 87 is pushed inwardly to the position shown in Fig. 2 for rotating the shaft while holding the control member or cam. Having held the button 12 in set position the latch 81 is returned to holding position as shown in Fig. 6, after pushing the unit including the knob 14 to latched position, and the latter unit is also held in latched position.

As mentioned above, an indicator and dial such as shown in Figs. 15 and 26 can be applied to this control device, but for purposes of clarity in illustrating the device, it is omitted in the structure of Fig. 2 and the associated figures. Of course, the desired station, and peak tuning for that station, can be ascertained by merely listening to the signals which are audible as the various station frequencies are crossed in rotating the knob 14 and shaft 32. However, the latter tuning is normally accomplished only by an operator relatively skilled in tuning. With either method of finding the station desired, however, the knob 14 is rotated until a desired station is tuned in. The angular relation between the held cam 33 and the shaft 32 at that station position will be maintained when friction is subsequently applied and each time that control member 33 is rotated to tuned position the inductance units will be in position for tuning that predetermined station. This same setting procedure can be followed for each of the plurality of control members 33. A button 12, other than the one corresponding to the last-to-be set control member 33 is then pushed in to operate the latch bar 81 and release the manual tuning mechanism including the knob 14, and the held control unit, but is not pushed in far enough so that the selector member 56 for that button 12 is latched. This position of the latch bar 81 is shown in Fig. 5. This last operation causes the button 12 and the knob 14, and their associated actuator mechanism to return to the idle position shown in Figs. 2 and 3. With the knob 16 and associated gear 127 again brought into operative connection with the crown gear unit 38, such unit is rotated in a direction to threadably move it to the right, as viewed in Fig. 2, to increase the friction on the control assembly, the stop 97 again limiting the movement of the shaft and permitting the final threading movement to occur to apply the desired friction while the shaft is held. With the control members all in set position, and frictionally held against rotation on the shaft 32, pushing any one of the buttons 12 to the tuned position, will tune the receiver to which the control device is connected by the cable C, and the latch will hold the selected push button unit with the station tab thereon in the innermost position to indicate the station being received.

A modification, and in some respects, the preferred embodiment of our invention is illustrated in Figs. 14 to 28, inclusive. Fig. 15, like Fig. 2, is shown in the actual size of a commercial embodiment of the invention. The structure of Fig. 15 is simplified over that of Fig. 2, and the housing is shorter in length. However, many of the elements in the modification are identical with those in the structure of Fig. 2, which were described in detail above, and others are substantially identical. The prefix "2" is employed on the reference characters designating such elements, and in some instances hereinafter, although one of such elements is not specifically described, the prefixed reference character is shown on the drawings to assist the reader in a comparison of the two structures and following the original description. The elements in the modified structure which are new over the elements in the first embodiment are indicated by reference characters beginning with the reference character "140" which merely continues the numbering from that employed for such embodiment.

In the modification, a two-piece housing is employed comprising a top portion 210 (Fig. 19), from which all of the mechanism is supported and a bottom portion 211, which is removable as a cover. The front of the housing is closed by a molded plastic escutcheon plate 140 from which a plurality of push-buttons 141 extend, and in which a dial scale 142 is mounted. The shafts for the tuning knob 214, and for the volume control knob 216 likewise extend through apertures in the escutcheon plate.

The automatic tuning mechanism itself for the device is very similar to that previously described except that the mechanism has been simplified and additional means are provided in the modification for removing all possible backlash so that the operation of the mechanism is extremely accurate, and yet moves freely with the minimum amount of operating pressure. The cushioned "feel," as previously noted, is likewise obtained Each push rod or selector member 256 is slidably mounted for linear movement in the front frame portion 258 (Fig. 20) and in the back frame portion 259 (Fig. 19). The frame portion 258 is provided with integral ears 143 which are secured to corresponding bosses in the cast mounting portion 210 of the housing. The back frame portion 259 is provided with similar ears 144 which are likewise secured to bosses on the housing member. Other elements in each control unit including a selector member 256, a lever 264, a control member 233, sickle-shaped driving link 240 and associated mechanism corresponding to that previously described, and as mentioned above, reference characters with the prefix "2" will identify such elements. The lever 264 has an opening 146 at one edge so that it may be slipped over the rod or frame portion 266 at an annular groove therein. In order to hold the lever on the rod and at the same time take out any backlash which might occur at this pivotal connection, a spring 147 is looped around the rod 266, hooked at one end around the back edge of the lever 264, and hooked at the other end around the lower edge of the frame portion 258. Each lever is held against axial movement on the rod 266 by the sides of the annular groove therein.

The rotary movement of the shaft 232 is limited to 90° by virtue of the configuration of the cam or control members 233, as previously explained. The outer limits are positively maintained by means of a stop member 148 (Fig. 16) keyed against rotation on the shaft 232. It has a pair of stop ears 149 thereon for engagement with a corresponding stop lug 149' on the frame portion 259 for the control mechanism. The stop member is of course axially movable on the shaft 232 with the control members and other elements but non-rotatable with reference to the same. The actual resonant frequency change upon rotation of the shaft is accomplished by means of the variable inductance units 217, 218 and 219, each including a structure as described above. The linear movement of the slug 223 corresponds in a desired ratio to the rotary movement of the shaft 232, and the latter movement is transformed into the former through the sickle-shaped driving link 240 coupled at one end to the slug 223, and pivotally connected at another end 244 to a radial arm 239. The arm is axially movable on the shaft 232 but keyed against rotation thereon. In order to prevent backlash between the link 240 and shaft, the arms are provided in pairs including the arm 239 and a similar arm 239'. The latter arm is displaced angularly on the shaft with reference to the first arm. A coiled spring 150 looped over the shaft is hooked at one end around the arm 239 to pull this arm into a firm engagement with the keyed portion of the shaft 232 corresponding thereto and the other end of the spring is hooked into the aperture 151 in the end of the arm 239' to maintain the spring under tension.

The driving link 240 for each control unit in the complete mechanism is maintained in proper alignment by means of a connecting or guide link 246 pivotally connected at one end to the body portion 244 of the driving link 240. The other end of the link 246 is secured by soldering or the like to a rod R which is common to all of the links 246 and is pivotally supported on ears 155 (Figs. 18 and 19) bent out of the frame portion 259. Operatively and fixedly connecting all of the links 246 assists in obtaining accurate tandem movement for the three slugs 223 and helps to eliminate backlash in the complete operating mechanism for the slugs. A bowed spring 152 (Fig. 22) hooks over the pivot stud secured to the arm 239 and the pivot stud secured to the link 246, prevents backlash intermediate these two members. Each slug 223 is coupled to a corresponding driving link 240 by means of a rod 249 secured at one end in the slug, and frictionally connected at the other end to an insulating member 253 which in this instance comprises a piece of fibre paper wrapped about the threaded end of the rod 249 and frictionally held on a coupling member 152 by bending over the edges of the coupling member as shown in Fig. 22. The coupling member is pivotally connected to a corresponding stud 153 on the end of the driving link 240.

The operation for automatic tuning of any one of the plurality of control units in the complete control apparatus, is in general identical with the operation described for the embodiment of Fig. 1. A selector member 256 is pushed inwardly from an idle position as illustrated in Fig. 21 to the final tuning position as illustrated in Fig. 22. The left-hand button and associated mechanism in Fig. 15 is shown in tuned position. Each button 141 for a selector member is molded from substantially transparent plastic material and includes a cavity 154 having a pair of longitudinal grooves in corresponding ribs 155 for slipping over and frictionally engaging the slightly yielding fingers F on the selector member. Side walls in the button also form a cavity 156 longitudinally of the button, and walls are also provided to form a substantially T-shaped opening 157 extending through the button from top to bottom. A station tab 158 is removably mounted in the cavity 157 as shown in Fig. 22, so as to be visible at the front of the button as shown in Fig. 14. A dial light 159 (Fig. 15) illuminates the dial scale 142 and likewise projects its rays directly and by reflection to and through the substantially transparent button 141, utilizing of course the cavities 154, 156 and 157. A colored diffusion plate D (Fig. 15) of composition material may be employed in back of the dial scale, and abutting the lamp at one end to assist in spreading the light over the entire unit, but this normally is not necessary with the L-shaped lamp as shown. Not only is the station tab 158 in each button well illuminated, but the entire button glows so as to present a very pleasing appearance for the front face of the device as a whole as well as provide readily visible indicating structure.

A modification of the illuminating means is illustrated in Fig. 20a. A lamp and socket assembly 195 is mounted in back of the transverse center of the dial scale. The assembly is rigidly secured to a bracket 197 of slightly resilient material which is snapped over the member 266 at an annular notch 198, and hooked at the front end over one edge of the frame portion 258 to maintain the bracket under tension. The lamp itself then projects through a notch 199 in the frame portion to illuminate the scale and buttons. The notch 199 is shown in Fig. 20 merely for purposes of illustration supplementing the vertical sectional view of the frame 258 in Fig. 20a.

The control device is illustrated in Fig. 14 as arranged at the control panel of an automobile so that only the front face of the escutcheon plate, and the dial scale and buttons are visible in the front of such panel. This figure also illustrates the small amount of structure which is visible and this can be as decorative as desired. The mounting of the device is accomplished by inserting bolts through apertures 160 extending entirely through the housing and securing the same to a supplementary mounting plate (not shown) and the latter is then secured to the frame of the automobile in the desired location. The mounting bolts may also cooperate to hold the two portions of the housing together.

The control or cam members 233 are frictionally retained in an axially movable assembly on the rotary shaft 232 by means including friction washers 234 as explained above. The rotary shaft 232 is rotated throughout its entire range and the friction on the cam 233 is varied by means including a tuning knob 214, a shaft 286 carrying such knob, and a linearly slidable carriage 287 supporting such shaft for rotary but not for linear movement with reference to such carriage. The carriage is supported in the frame (Fig. 15a) in the manner described with reference to the carriage 87. Selected operative connection with the shaft 232 is accomplished with a spiral-worm 162 (Fig. 17). This is carried on the shaft 286 and mounted directly on a cup 163 which is likewise carried on the shaft 286. The mounting aperture in the cup is provided in a configuration such that the cup and gear won't rotate on the shaft but are longitudinally movable thereon. The spiral-worm could be mounted as desired without the use of the cup, but this combination has been found less expensive for production than the spiral-worm alone having a central formation to permit keying on the shaft. In order to eliminate backlash as much as possible and provide a yielding connection between the spiral-worm 162 and a spur gear unit 164 on the shaft 232, a spring 161 surrounds the bushing 165 for carrying the shaft 286 therein. The spring 161 bears against the cup 163 at one end and at the other end rests against the shoulder of the bushing. The cup and spiral-worm are limited in their longitudinal movement with reference to the shaft 286 by the shoulder 166 on such shaft, and a flange 167 at the end of the shaft within a cavity in the spiral-worm.

If it is desired to tune the inductance units manually to some position other than that provided for in the automatic control structure, or if it is desired to reduce the friction on the control members 233 to change the setting thereof, knob 214 is pushed inwardly to move the carriage 287 to a position at which the latching shoulder 282 on the pivoted latch 281 engages a latching shoulder on such carriage. In this position the spiral-worm engages the spur gear 168 rigidly secured to a threaded bushing 169 which in turn is threadably secured upon the rotary shaft 232 as is evident from Fig. 15. These elements comprise the friction varying unit 165, and of course, also provide the connection to the shaft 232. In this position the spring 161 is under pressure so as to maintain the spiral-worm 162 and the spur gear 168 in maximum meshing engagement and prevent any backlash in this mechanism. Upon rotating the knob 214 in one direction or the other, depending upon the desired rotation of the shaft 232, such shaft is turned until it is stopped by the stop portion 148, as previously described. For illustration we will assume that the spur gear unit 168 is in the applied friction position and the shaft 232 is stopped at a limit of angular movement so that the spur gear 164 may be rotated and the bushing 169 threadably moved to the right to release the friction. The knob 214 is rotated in a counter-clockwise direction as viewed in Fig. 15 to accomplish this movement of the friction unit with reference to the shaft until it frictionally engages a washer 171 to releasably lock the friction unit to the shaft. While holding the knob 214 depressed a selected push button 141 and associated structure is then pressed inwardly to the tuning position of Fig. 22. The latch bar 281 is pivoted upwardly from the carriage 287 and then pulled downwardly by the spring 2103 to engage and retain both the selector member 256 and carriage 287 in latched position. With the friction unit 164 held against rotation relative to the shaft 232, by frictional engagement with the washer 171, the shaft 232 is rotated by the clockwise rotation of the knob 214 until the angular relation between such shaft and the control member 233 corresponding to the actuated selector member 256 corresponds to a desired resonant frequency, or station setting. As the shaft 232 is rotated the connecting mechanism to the slugs 223 move these simultaneously and linearly. When the carriage 287 is released by the latch bar 281, the irregular-shaped spring 170 (Fig. 15a), secured at one end to the end of the rod 266 and hooked at the other end to the carriage, returns the carriage to idle position.

With the driving threads on the spiral-worm 163 provided on the face thereof such member can be readily brought into driving engagement with the spur gear 168 and act as a very effective clutch. Due to the yielding mounting for the spiral worm and the thread configuration it will follow the spur gear as it moves to the right and left to vary the frictional pressure on the control assembly. In addition, as mentioned above, the spring pressure eliminates backlash, and also permits the spiral-worm thread to jump out of connection with the spur gear, should the latter come to an abrupt stop. With the ordinary worm such a condition might cause a tooth to be broken or the like. Furthermore it would be impossible to declutch a worm from a spur gear without very expensive and complicated structure. As can be seen in Fig. 15a the shafts 286 and 232 are almost in horizontal alignment, thus taking up only a small vertical space. Furthermore, the spiral-worm and spur gear combination provides a very flexible structure so far as mounting is concerned for the pitch and position of the threads can be changed readily in the method of manufacture employed therefor, and the worm with the shaft 286 can be moved vertically with reference to the shaft 232 and yet obtain the same clutch and driving action.

The rotation of the shaft 232 is ascertained from the position of the tip of the pointer 172 moving in back of the dial scale 142. The pointer is operatively connected to such shaft by means including a string or cable 173 carried over an idler pulley 174 and wound around and secured to a drum 175 on the shaft 232.

The string 173 merely winds or unwinds on the drum 175 depending on the direction of rotation of the shaft 232. The indicating mechanism as a whole includes a link 176 secured to the string 173, and pivotally secured to the pointer 172 adjacent one end thereof. Pivotal guide mountings for the pointer are also provided which include a guide link 177, and a mounting link 178. The guide link 177 is pivotally mounted on a stud 179 screwed into the top portion 210 of the housing, and the mounting link 178 is pivotally supported on a similar stud 179' likewise screwed into the top portion. The pointer 172 is pivotally connected with link 178 at the pivot point 180. Without the guide link 177, at least, the pointer could pivot from the point 180 in a manner such that the tip thereof would follow an arcuate path. However, the dial scale 142 is straight and in order to move the tip of the pointer along this straight line, the link 178 pivots, and the guide link 177 likewise pivots when the string 173 is moved, and by virtue of the placement of these elements and the pivot points 179 and 179', as shown in Figs. 15 and 26, the tip of the pointer moves along a straight line path.

The pointer is continuously under tension by virtue of the connection of the spring 182 therewith at one end, the other end of the spring being supported on the frame portion of the mechanism. The pointer is pivoted to the left, as viewed in Fig. 15 against the tension of the spring when the knob 214 is rotated in one direction, and when the knob 214 is rotated in the opposite direction, the tension of the spring 182 pulls the string 173 and consequently the pointer 172 toward the right to the position illustrated. Three different positions of the indicating mechanism are shown by full and dotted lines in Fig. 26. The lamp 159, (or 195) being behind the tip of the pointer direct rays from the lamp and reflected rays coming off of the frame portion 258 as well as the diffuser D, illuminates the dial and the area behind the same so that the pointer tip pointed a contrasting color, is readily visible at the scale as it moves across the same, and the position of the shaft 232 is immediately visible. This indicating mechanism provides a free operating structure which requires an extremely small, flat space for operation at right angles to the plane of the dial and is another factor in providing such a compact control device. The indicator is simple as to the structure itself, as well as to its connection with the shaft 232, so that it not only represents a low cost device in every way, but one which is very quickly and easily assembled in the control mechanism.

For a better understanding of the entire control device, the circuit therefor is illustrated in Fig. 25. Although this circuit specifically applies to the embodiment of the control device illustrated in Figs. 14 to 28, it is substantially the same as the circuit for the control device of Figs. 1 to 13, inclusive. The complete circuit and hence the control device system includes a lead 186 for connection to the A supply for the complete radio receiver system and this line includes a fuse 187 therein. The "on and off" switch for the entire receiver system is indicated at W in the circuit diagram, and this switch is combined physically with the volume control which is indicated in Fig. 15 by the reference character 2138. The control device is connected with a suitable antenna 188 by an antenna coupling 189 (Fig. 18), and the antenna circuit includes therein a variable padder condenser 191. The inductance units 217, 218 and 219 for the antenna, oscillator and R. F. circuits, respectively, are connected with corresponding circuits in the radio receiver through leads enclosed within a single cable 192 serving as the only connection between the tube circuit of the radio receiver and the control device. Of course the volume control 2138 and the switch W are likewise in the complete radio receiver system circuit, but the connections from these elements are also made through conductors in the cable 192, as is evident from the circuit diagram. The shunt trimmer condensers for the antenna, oscillator and R. F. circuits are each indicated by the reference character 193. In the commercial embodiment of the invention, mica condensers of various values are employed in each of the circuits and indicated by the reference character 194, while a heavier condenser is employed in the oscillator circuit at 196. Inasmuch as the values of these condensers as well as the inductance units themselves will vary in accordance with the circuit design in an adaptation of our invention, it is not believed to be necessary to give the values of the same. The control device as a whole is grounded to the chassis of an automobile, or grounded in a suitable manner when employed in a home receiver, either through the outer metal braid of the cable 192 or in any other desired manner.

In the present invention, therefore, we provide a compact, sturdy control device, particularly adapted for an automobile radio receiver, but one which can be applied to a home set receiver. The complete device is so small and is of such construction that it may be very quickly mounted on, or demounted from many different places on an automobile, at a very low service cost. The flexibility in mounting is further emphasized by virtue of the fact that complete resonance frequency change can be accomplished in the control device itself, and it is connected to the radio receiver proper merely by an electric cable, which can vary in length and can be easily wound around and through relatively inaccessible places on an automobile. Because of the varied design in automobile construction, the compactness, and ease and flexibility of mounting of our device permits installations which were heretofore not practical, or were substantially impossible. The control device of our invention provides not only manual control over an entire broadcast band, but it is likewise employed to tune automatically to a plurality of predetermined stations.

Although we have illustrated and described our invention in its preferred embodiments, it is understood that modifications therein may be made all within the spirit and scope of the invention, and the invention, therefore, is not limited by the above description and drawings, but is limited only by the scope of the appended claims.

We claim:
1. A radio tuner including in combination a selector member having a finger engaging portion at one end and a guide portion at the other end thereof, a frame slidably carrying said selector member for linear movement therein, a rotary control member, and a pivoted lever operatively connected to said selector member intermediate the ends of said selector member and movable therewith for engaging said control member to move the latter upon movement of the selector member.

2. A radio tuner including in combination a non-pivoted selector member, a rotary control member having a depression on one edge thereof and two cam portions extending in generally opposite directions from said depression with each of said cam portions having an engaging edge thereon, a pivoted lever operatively connected to said non-pivoted selector member and movable therewith for engaging one cam portion or the other at the engaging edge thereof to move said control member until the lever is in engagement with both of said cam portions at said depression for tuned position, and means yieldably connecting said lever member and said selector member to permit movement of one of said two members independently of the other yet maintain them connected and to provide a cushioning effect as between the two members and the control member when they are all in tuned position.

3. A radio tuner including in combination a frame, a selector member slidably supported upon said frame for linear movement therein, a rotary control member, a lever pivotally mounted at one end upon said frame and having an engaging portion at the other end for engagement with said rotary control member to directly move the same, and means for operatively connecting said selector member with said pivoted lever including spring means secured at one end to said selector member and secured at the other end to said lever adjacent the engaging portion thereon with said spring connection normally causing said lever to move with said selector member over at least a portion of the linear travel therefor.

4. Control apparatus for a radio receiver including a linearly movable selector member having an engaging shoulder intermediate the ends thereof, a lever pivotally supported at a pivot point lying between the ends of said selector, and an engaging projection on said lever in a position thereon so as to lie in the linear path of movement of the selector shoulder for engagement by said shoulder, a spring connected at one end to said selector and at the other end to said lever to move said lever therewith until the actuating pressure on said selector is sufficient to overcome the tension in said spring whereby the selector shoulder engages the lever projection to move the lever, a rotary shaft, and a control member on said shaft for driving engagement by said lever upon actuation of said selector member.

5. In a radio tuner, the combination of a rotary shaft, means for rotating said shaft, movable frequency changing means, a link, and means for connecting said link to said shaft and eliminating back lash therebetween, said connecting means including a pair of rotary arms spaced apart axially on said shaft and keyed thereon substantially against rotary motion relative thereto but being axially movable thereon, with said link being pivotally supported on one of said arms, and tensioned spring means intermediate and connected to each arm acting in an angular direction to retain the link supporting arm on said shaft against angular play with reference thereto.

6. A radio tuner including in combination, movable selector means, rotary control means operated thereby, movable frequency changing means, means operatively connecting said rotary control means and said frequency changing means including a radially extending arm on said rotary control means, a link pivotally connected both to said frequency changing means and said arm at substantially opposite ends of said link, and guide means pivotally connected to said link to retain said link in a substantially single path of movement.

7. A radio tuner including in combination, a frame means including a front portion and a back portion, a plurality of control units, with each of said control units including linearly movable control means in said frame means and available for operation at the front portion thereof, additional control means supported in said frame means at the back portion thereof and movable in a linear direction, and connecting means intermediate said two linearly moving means and operatively connecting the same including means for converting linear movement into rotary movement in the connecting means and then converting the rotary movement into linear movement in the additional linearly movable control means.

8. Tuning apparatus for a radio receiver including a frame, a rotary control shaft having a driven gear thereon, and means for driving said gear to drive said shaft, said means including a driving member having a spiral thread on a face thereof with the plane through said face extending substantially parallel to said control shaft, a driving shaft supported in said frame for rotatable and longitudinal movement, a supporting member on said shaft at one end thereof secured against rotational movement with reference to said driving shaft but longitudinally movable thereon for a limited distance, with said driving members secured to said supporting member and movable therewith, with said driving shaft mounted in said frame in a position at right angles to said control shaft but not crossing the axial line of said control shaft and being movable toward said control shaft to engage said driving member with said driven gear, and spring means surrounding said driving shaft and acting on the supporting member for said driving member to yieldably maintain said driving member in engagement with said driven gear to maintain an efficient driving connection therebetween.

9. In radio control means having slug driving means thereon, the combination of means for changing the resonant frequency of a radio receiver including a coil unit, and a metal slug linearly slidable in said coil unit, and means connecting said driving means and said slug including a rod secured in said slug at one end and having an irregular surface at the other end, and an insulating coupler frictionally engaging the irregular surface of said rod and normally fixed thereon and apertured to pivotally connect with said driving means.

10. In a radio control means having slug driving means thereon, the combination of means for changing the resonant frequency of a radio receiver including a coil unit, and a metal slug linearly slidable in said coil unit, and means connecting said driving means and said slug including a rod secured in said slug at one end and having an irregular surface at the other end, and a coupler including a metal body portion for pivotal connection with a corresponding pivot member on said driving means, an insulating portion surrounding said rod at said irregular surface and frictionally engaging the same, and means for frictionally retaining said insulating means on said body portion of said coupler.

11. In radio control means the combination of means for changing the resonant frequency of a radio receiver including a coil unit, and a metal slug linearly slidable in said coil unit, driving means for sliding said slug in said coil unit, including a pivoted link, and means connecting said link and said slug including a rod secured in the slug at one end and having a hook at the other end, and an insulating stud on said link for pivotally supporting the hook on said rod.

12. In radio control means the combination of a plurality of inductance coil units each having a slidable metal slug unit therefor and all slug units being simultaneously slidably moved with reference to their respective coil units, means for simultaneously slidably moving said slugs including a rotary shaft, a plurality of links operatively connected to said shaft and operatively connected to said slug units, a guide member for each link to maintain the same in a path of movement substantially at right angles to the rotary shaft, frame means rigidly supported in said control means and a shaft pivotally supported on said frame means, with each of said guide members rigidly secured to said rotatable shaft to move therewith in unison upon rotation of said rotary shaft for moving said slug units.

13. A demountable control unit for a radio receiver including in combination an enclosing housing relatively shallow in vertical dimension and having a top portion and a bottom portion, control means within said housing occupying substantially the entire space between the top portion and the bottom portion thereof, said control means including a rotary shaft supported in said housing, and indicating means for indicating the angular position of said shaft, said indicating means including an elongated dial scale extending transversely of said housing at the front thereof positioned in a plane substantially vertical to the top portion and bottom portion of said housing, and pointer mechanism for said scale supported on one of said two housing portions moving in a substantially longitudinal plane and in a shallow space intermediate the control means and the supporting portion of said housing, said mechanism including a supporting link pivotally secured to said supporting portion, a guide link spaced from said supporting link and pivotally secured to said supporting portion, and a pointer pivotally connected to both said supporting link and said guide link and operatively connected with said rotary shaft having a pointer tip at one end thereof moving in a substantially straight line across said transverse dial scale upon rotary movement of said shaft with said supporting link, guide link, and said pointer being relatively thin so as to be readily accommodated in said shallow space intermediate the control means and the supporting portion of the housing.

14. Tuning apparatus for a radio receiver including a frame, a rotary shaft, a plurality of control members supported on said shaft and spaced apart from one another axially of said shaft, selector members mounted for actuating movement at right angles to said shaft with a selector member corresponding to each of said control members, and means for supporting said shaft in said apparatus in a manner to compensate for a misalignment between said control members and the corresponding selector members and permit a rapid assembly of said shaft, said means including a bearing at one end of said shaft comprising an adjustable unit mounted in said frame for adjustable axial movement having a ball-like portion on the end thereof fitting in a corresponding cavity in the end of said shaft, said unit having a restricted neck portion adjacent said ball-like end portion to provide a substantially universal joint between said shaft and said bearing at said bearing end thereof.

15. In radio tuning apparatus having frequency changing means therein, means for operating said frequency changing means including in combination, a linearly movable pusher having a guide portion at one end, a button portion at the other end, and an actuating portion intermediate said two portions, a pivoted actuating lever movable independently of the pusher but adapted for operative connection with said pusher at said actuating portion, with said operative conection being effective during one portion of the complete operating stroke of said pusher, and a spring intermediate said lever and said pusher and operatively connected with each acting over the other portion of the operating stroke of the pusher as the sole operating connection between said pusher and lever and pulling said lever therewith during such other portion.

16. In radio tuning apparatus having frequency changing means therein, means for operating said frequency changing means including in combination a linearly movable pusher, means for slidably supporting said pusher at one end, a push button on said pusher at the other end and an actuating portion intermediate said two ends, actuating means in said tuning apparatus movable independently of the pusher but adapted for operative connection with said pusher at said actuating portion, inter-engaging portions on said pusher and said actuating means for accomplishing said operative connection therebetween, a spring connected to said actuating means and to said pusher at a point between the guided end and the actuating portion normally acting over the initial portion of the operating stroke of the pusher to pull said actuating means therewith, said inter-engaging portions normally being in engagement over the remainder of said operating stroke, and with said pusher pushing said actuating means over said remainder of the operating stroke.

17. In radio tuning apparatus having frequency changing means, linearly movable actuating means and substantially movable driven means therefor, connecting means for said actuating means and said driven means including in combination a pivotal sickle-link having a small portion at one end and an enlarged portion at the other end thereof, pivotal means at said small end for operative connection with said linearly movable driven means and a pair of pivot portions on said enlarged end and spaced apart from one another thereon, a guide link supported at one of the pivot portions on said enlarged end and a connecting link at the other pivot portion for operative connection with said movable actuating means.

18. In a radio tuning device, the combination of a variable inductance tuning unit having a coil form, a metal slug linearly movable in said form, adjusting means for said slug having a driving portion moving in a substantially linear path, and means for mounting said coil form in a manner to absorb any deviations of the driving portion from a straight-line movement so that the metal slug movable in the form will not break such form, said mounting means including frame means extending substantially at right angles to the line of movement of said slug, yieldable means supported on said frame means, and means for supporting said coil form on said yieldable means.

19. In a demountable self-contained radio control unit for mounting remotely from a radio receiver chassis and connected thereto by electrical means only, the combination of a compact housing, relatively shallow in vertical dimension, substantially rectangular in longitudinal cross-section and having a pair of housing elements, frequency changing means including a plurality of inductance units on one of said elements at one end thereof and with said element serving as a frame mounting for said units, each inductance unit including a mounting member, a coil form mounted thereon and extending substantially longitudinally thereof and toward an end of said element opposite to said one end, and all of said coil forms being spaced apart transversely of the housing and substantially parallel to one another, and a metal slug movable in each form, means for simultaneously adjusting said metal slugs longitudinally of the coil forms including a plurality of tuning pushers supported at said opposite end of said housing and adapted for linear slidable movement to maintain the vertical dimension of the housing at a minimum, and connecting means intermediate said adjusting means and said slugs adapted to occupy a relatively small space vertically and longitudinally in said housing including rotary moving link means for each core, with each means moving in a vertical plane and operatively connected with a corresponding slug to pull said slug in at least one position substantially to the end of the form and into the space in the housing, occupied by the adjusting means and connecting means to conserve space longitudinally of the housing and provide a compact housing structure from the one end to the opposite end.

20. Radio tuning means including frequency changing means having a pair of interleaving members, mounting structure for said means, with a first one of said members being substantially linearly moveable in said other member to change the electrical characteristics of the frequency changing means, means for mounting said other member on said mounting structure in a manner to permit lateral movement thereof including a yieldable grommet supported on said mounting structure and an eyelet operatively connected to said other member and supported on said grommet, and control means operatively connected with said first member to slidably move the same in said other member, and said mounting means providing yieldability for said other member to compensate for any tendency to lateral displacement in said control means upon slidably moving said first member and thereby prevent injury to said members.

21. Control apparatus for a radio receiver including a selector member having an engaging portion, a pivoted member having an engaging portion thereon, with said engaging portions being relatively positioned for engagement with one another in the operating movement of said selector member, means for pivotally supporting said pivoted member at a point spaced laterally from the selector member and intermediate the ends of said selector member at idle position of the selector member, a spring connected to said selector member and to said pivoted member to normally move said pivoted member therewith until the actuating pressure on said selector member is sufficient to overcome the tension in said spring whereupon said engaging portions on said members are engaged to move the pivoted member, and a movable control member for driving engagement by said pivoted member upon actuation of said selector member.

22. A radio tuner having in combination, driving means including rotary means, frequency changing means including movable driven means, means supporting said driven means for substantially linear movement, a substantially sickle-shaped link having a cavity portion and operatively connecting said rotary means and said driven means, with said link being pivotally connected to said rotary means and to said driven means, means operatively connecting said link and said rotary means, and means operatively connecting said link and said driven means, with the cavity portion of said link substantially fitting over a portion of the rotary means in one position of the frequency changing means and thereby acting to reduce the open space required in the tuner for operating movement of the link, and with said link moving the driven means to a position at which a portion thereof extends transversely of the rotary means and said portion is spaced laterally therefrom.

23. In radio control means including resonant frequency changing means having a coil, a metal member movable relative thereto, and means for driving said metal member, the combination of a rod secured at one end in said metal member and having an irregular surface at the other end, and a coupler of insulating material having a walled cavity extending longitudinally therein with the wall frictionally engaging the irregular surface of said rod to connect the coupler and rod, with said coupler being of a construction for connection with the driving means so as to move said metal member therewith.

24. In radio control mechanism adapted to occupy a relatively shallow space in a direction at right angles to the longitudinal dimension of said mechanism having a tuning unit with a pair of tuning members, one tuning member being substantially linearly movable relative to the other in a direction longitudinally of the mechanism, and selector means for adjusting the tuning unit, the combination of means operating in said relatively shallow space for operatively connecting said linear tuning member and said selector member and for indicating the tuned position of the unit, including a rotary shaft operatively connected with the selector member, link means operatively connected with said shaft and with said linear tuning member acting to convert the rotary movement of the shaft into said substantially linear movement in the linear tuning member and having a cavity therein to fit over said shaft in one position of the link and reduce the necessary operating space for said link, and indicator means movable in a plane extending longitudinally of the mechanism and spaced laterally from the shaft and link and occupying a shallow space, including a relatively thin pointer, means for guiding and supporting said pointer at one end, and pivotal means connected to said pointer intermediate the ends thereof for operatively connecting said pointer and shaft to move the pointer with the shaft.

25. In adjusting mechanism having an actuator with an engaging portion and a latching portion and an adjuster movable upon movement of said actuator, the combination of means for operatively connecting said actuator and adjuster, and means for engaging the actuator latching portion for selectively retaining said connecting means in an actuated position, said connecting means including a pivoted member for directly moving the adjuster having an engaging portion, resilient means operatively connecting said actuator and pivoted member to normally pull said pivoted member therewith when the actuator member is moved until the actuating pressure overcomes the tension in the resilient means whereupon said two engaging portions interengage and said pivoted member is moved directly by said actuator, said retaining means being positioned with relation to the travel of said actuator in an actuating direction so that said latching portion moves beyond the retaining means at maximum displacement of the actuator, with said resilient means permitting said actuator to recoil in its actuating path while retaining the pivoted member in contact with said adjuster, so that said engaging portions are separated in the retained position of the actuator and connecting means.

26. In radio tuning apparatus having driving means and frequency changing means having frame means and including a pair of telescoping members with one member being substantially linearly movable with reference to the other member but being limited in its movement so that it remains in telescoping relation to said other member, the combination of means for operatively connecting said driving means and said one member to move the latter, and means for mounting said other member on said frame means in a manner to permit lateral movement of the telescoped members for compensating for any deviation from straight line movement of the connecting means at the operative connection with said one member and thereby prevent injury to the telescoped members in the movement of said one member relative to the other member, said mounting means including a yieldable annular member secured to said frame means at an opening in the frame means and means secured to a portion of the other member and operatively connecting said other member to said yieldable annular member.

27. A control device for a radio receiver relatively short longitudinally and relatively shallow vertically including in combination means for changing the resonant frequency of a radio receiver, said means including a coil unit and a metal slug linearly movable in said coil unit, a rotary shaft for slidably driving said slug in said coil unit, actuating means operatively connected with said shaft to rotate the same, means connecting said rotary shaft and said slug including a connector secured to said slug, a link operatively connected with said shaft and pivotally movable with reference thereto, insulating coupler means operatively connecting said link and said connector at a portion of said link, and means for mounting said link, said mounting means including a driving member fixed on said rotary shaft and pivotally connected to a second portion of the link to move said second portion of the link in an arcuate path upon rotary movement of the shaft, and guide and retaining means pivotally connected at one end to a third portion of said link spaced from said second portion thereof and with another end of said guide and retaining means mounted for pivotal movement at a fixed point to provide and limit relative pivotal movement between said link and driving member during rotation of the shaft, means connecting said first mentioned link portion and said insulating coupler means and moving in a substantially linear path during the shaft rotation, with said link, said mounting means, and said guide and retaining means all cooperating to convert the rotary movement of said shaft into substantially linear movement for said connector and slug and accomplish the movement of the link in a relatively small space longitudinally and vertically in such control device.

28. In radio control means the combination of a rotary control assembly, means for actuating said assembly, inductance tuning means including a coil unit and a substantially linearly movable slug unit supported thereby, means for operatively connecting the slug unit and the control assembly, said connecting means including insulating means operatively connected to said slug unit with the point of connection of said insulating means and said unit following a substantially linear path upon movement of the slug unit corresponding substantially to the path of movement of said slug unit, link means operatively connected at one end to said insulating means, a driving member operatively connected to said rotary assembly so that said driving member is movable with the rotary control assembly, means operatively connecting another end of said link means to said driving member, and guide means to guide and limit the movement of the link means, and axis means pivotally connecting said guide means with a portion of said link means which is spaced from each of said two-mentioned ends of said link means, with said axis means being movable relative to a substantially fixed portion of said guide means.

29. In radio tuning apparatus having frequency changing means including a coil and metal core means movable therein in a substantially linear direction, and a rotary control assembly for causing movement of said core means, and means for operatively connecting said rotary control assembly and said substantially linearly movable core means including link means having one end portion larger than the other end portion, insulating means operatively connecting the smaller end portion and said movable core means, rotary driving means operatively connected to said rotary control assembly, means pivotally connecting said driving means and the larger end portion of said link means, and guide means operatively and pivotally connected at one end to said link means at the larger end portion but at a point spaced from said pivotal connection, said guide means being pivotally connected at another end to a fixed point to guide and limit the movement of said link means, with the point of connection of said insulating means and said movable core means following a substantially linear path corresponding substantially to the path of movement of said core means.

30. Radio tuning apparatus including in combination rotary means having adjustable means thereon adjustable to positions corresponding to predetermined tuning positions, means for actuating said rotary means, a plurality of inductance tuning means each including a movable unit movable substantially linearly in the tuning means and motion-transferring means operatively connecting said rotary means and movable units including pivoted link means driven by said rotary means to predetermined tuning positions, a plurality of insulating means mounted on said pivoted means and each connected with a corresponding unit, each said insulating means being movable with said pivoted link means in a substantially linear path corresponding substantially to the path of movement of said movable unit, and means in said pivoted means common to all of said units.

31. A radio tuner including in combination, frame means including a front portion and a back portion, a plurality of control units, with each of said control units including linearly movable control means on said frame means and available for operation at the front portion thereof, additional control means supported on said frame means at the back portion thereof and movable in a linear direction, and motion-transferring means intermediate said two linearly moving means and operatively associating the same including means for converting linear movement into rotary movement in the motion-transferring means and then converting the rotary movement into linear movement in the additional linearly movable control means.

32. A radio tuner including in combination, frame means including a front portion and a back portion, a plurality of control units, with each of said control units including linearly movable control means on said frame means and available for operation at the front portion thereof, additional control means supported on said frame means at the back portion thereof and movable in a linear direction, and motion-transferring means intermediate said two linearly moving means and operatively associating the same including means for converting linear movement into rotary movement in the motion-transferring means and then converting the rotary movement into linear movement in the additional linearly movable control means, said control units including selectively operable key bars having respectively different amounts of operating movement.

33. A radio tuner including in combination, frame means including a front portion and a back portion, a plurality of control units, with each of said control units including linearly movable control means on said frame means and available for operation at the front portion thereof, additional control means supported on said frame means at the back portion thereof and movable in a linear direction, and motion-transferring means intermediate said two linearly moving means and operatively associating the same including means for converting linear movement into rotary movement in the motion-transferring means and then converting the rotary movement into linear movement in the additional linearly movable control means, said additional control means including a linearly movable element of variable inductance mechanism.

34. A radio tuner including in combination, frame means including a front portion and a back portion, a plurality of control units, with each of said control units including linearly movable control means on said frame means and available for operation at the front portion thereof, additional control means supported on said frame means at the back portion thereof and movable in a linear direction, and motion-transferring means intermediate the same including means for converting linear movement into rotary movement in the motion-transferring means and then converting the rotary movement into linear movement in the additional linearly movable control means, said additional control means including a linearly movable ferromagnetic core of variable inductance mechanism.

35. A radio tuner including in combination, frame means including a front portion and a back portion, a plurality of control units, with each of said control units including linearly movable control means on said frame means and available for operation at the front portion thereof, additional control means supported on said frame means at the back portion thereof and movable in a linear direction, and motion-transferring means intermediate said two linearly moving means and operatively associating the same including means for converting linear movement into rotary movement in the motion-transferring means and then converting the rotary movement into linear movement in the additional linearly movable control means, said additional control means including a plurality of linearly and simultaneously movable ferromagnetic cores of variable inductance mechanism.

36. A radio tuner including in combination, frame means including a front portion and a back portion, a plurality of control units, with each of said control units including linearly movable control means on said frame means and available for operation at the front portion thereof, additional control means supported on said frame means at the back portion thereof and movable in a linear direction, and motion-transferring means intermediate said two linearly moving means and operatively associating the same including means for converting linear movement into rotary movement in the motion-transferring means and then converting the rotary movement into linear movement in the additional linearly movable control means, said motion-transferring means including a bar for operating actuation in common by said control units.

RICHARD C. MARHOLZ.
ALEXANDER W. PLENSLER.